United States Patent
Hickerson

[15] 3,638,021
[45] Jan. 25, 1972

[54] INFRARED HORIZON SENSOR FOR MEASURING SATELLITE PITCH AND ROLL

[72] Inventor: Robert L. Hickerson, Baltimore, Md.
[73] Assignee: The United States of America as represented by the Secretary of the Navy
[22] Filed: Aug. 19, 1969
[21] Appl. No.: 851,405

[52] U.S. Cl................250/83.3 H, 250/202, 250/203 R
[51] Int. Cl...............................................G01j 1/20
[58] Field of Search........................250/83.3 H, 203 R, 202

[56] References Cited
UNITED STATES PATENTS 3,519,823   7/1970   Heller et al. ..................250/83.3 H Primary Examiner—Walter Stolwein
Assistant Examiner—Davis L. Willis
Attorney—R. S. Sciascia, J. A. Cooke and R. J. Erickson

[57] ABSTRACT

An infrared sensor carried aboard a satellite is driven to conically scan the horizon of the celestial body, such as the earth, about which the satellite is orbiting. The output of the sensor is a signal whose amplitude is constant when the satellite is in its nominal attitude and whose amplitude varies sinusoidally if the satellite attitude deviates from nominal. This output from the sensor is combined with signals responsive to the scan drive mechanism uniquely defining the scan angle, so as to produce output signals indicating pitch and roll of the satellite.

4 Claims, 4 Drawing Figures

INVENTOR
ROBERT L. HICKERSON

INVENTOR
ROBERT L. HICKERSON

INFRARED HORIZON SENSOR FOR MEASURING SATELLITE PITCH AND ROLL

BACKGROUND OF THE INVENTION

In many present day satellites or other spacecraft, the attitude of the spacecraft relative to the earth (or other celestial body) is measured by employing infrared horizon scanners mounted in the spacecraft to scan a pattern selected to intersect the earth's horizon. As the scanner sweeps its pattern, the ideal infrared sensor output is zero for space and some finite value for the earth's surface. An obvious disadvantage of present infrared horizon scanning systems is that the useful data (horizon crossings) are a very small part of the actual data taken. To overcome this disadvantage, the so-called "-dithered" horizon sensor restricts the scan to the horizon with the length of the scan decreased to the point where expected librations do not put the horizon outside the scan pattern. Once again, however, attitude error detection is based on detecting the geographic horizon from the step change in the infrared sensor output. However, accuracy is somewhat increased in the "dithered" sensor system as a result of averaging more horizon crossings per unit time.

On the other hand, three distinct problems arise when utilizing the horizon sensor systems previously proposed and based upon the principle that attitude error detection can be accomplished by sensing the horizon crossing. First, the step change in the sensor output which occurs at the horizon is not abrupt and moreover, the actual structure of the change is a function of wavelength. Secondly, the infrared horizon has a larger apparent radius at the geographic equator than at the poles and therefore a latitude correction is required. Finally, significant noise is introduced into the data because of the large bandwidth required to process the changes in signal at horizon crossings.

SUMMARY OF THE INVENTION

In accordance with the present invention, the satellite or other spacecraft carries an infrared horizon sensor which is driven to conically scan the horizon of a celestial body, such as the earth. When the satellite is in its nominal attitude, the horizon bisects the conical scan pattern of the sensor and thus produces a constant amplitude output. If the attitude of the satellite should vary or deviate from nominal, the output signal of the infrared sensor will vary sinusoidally as the sensor is conically scanned. The scanning angle of the sensor is also monitored and produces a second output signal which accurately indicates the scanning angle of the sensor. These two signals are then combined to produce a signal output accurately indicating any deviation of the spacecraft attitude from the nominal or desired attitude.

In the proposed system of the present invention, the required bandwidth is reduced from that required to process a step change (as in the previously proposed horizon-sensing systems) to that of the attitude control system; i.e., from a few hundred cycles per second to thousandths of a cycle per second. Moreover and as previously mentioned, the effect of wavelength is to distort the structure of the horizon-crossing step and thereby make it difficult to design horizon detectors which must trigger on a threshold. The conical scan processor of the present invention, on the other hand, requires only circular symmetry since the structure of the horizon crossing is integrated out and small variations from circular symmetry appear as random noise which can be readily removed by filtering. Finally, the latitude effect, mentioned above as a deficiency in the prior art horizon-sensing systems, appears as a second harmonic of the scan frequency in the system of the present invention and therefore, as will be described in more detail hereinafter, poses no problem.

In view of the foregoing, one object of the present invention is to provide a method and apparatus for measuring attitude variations of a satellite or other spacecraft employing a conically driven infrared horizon sensor.

Another object of the present invention is to provide a method and apparatus for measuring satellite or spacecraft attitude deviation utilizing correlation, as opposed to threshold, techniques.

Another object of the present invention is to measure satellite or spacecraft attitude utilizing infrared horizon sensors which are less dependent on geographic latitude or choice of wavelengths than in previously proposed systems.

A further object of the present invention is to provide a method and apparatus with reduced bandwidth requirements for conically scanning the horizon of a celestial body, in order to determine the attitude of a satellite or other spacecraft relative to the celestial body.

Other objects, purposes and characteristic features of the present invention will in part be pointed out as the description of the present invention progresses and in part be obvious from the accompanying drawings, wherein.

Figure 1:
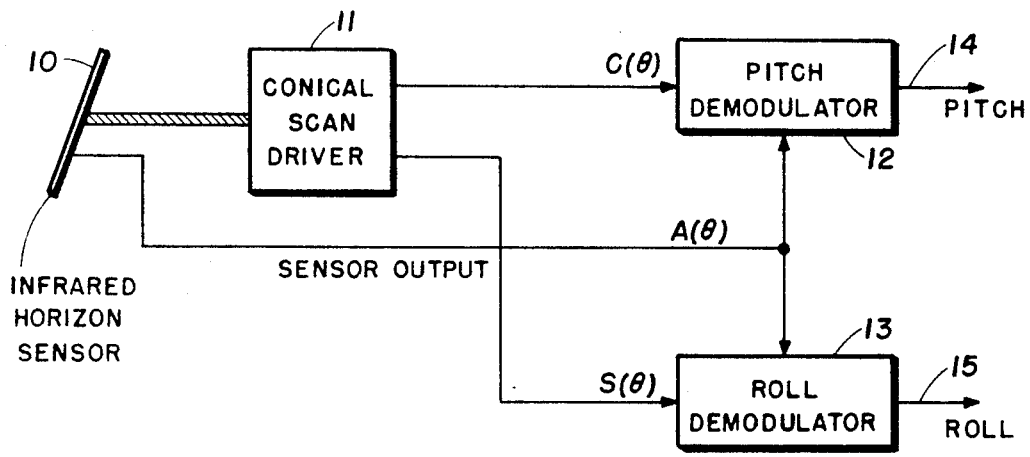
FIG. 1 is a simplified block diagram of one embodiment of the present invention.

Referring now to FIG. 1 of the drawings, the satellite or spacecraft carries and infrared horizon sensor 10, of any suitable design, which is driven by unit 11 to conically scan the horizon of the celestial body, such as the earth, about which the satellite is orbiting, for example. As will be described in more detail hereinafter, in connection with FIG. 3, when the satellite is in its nominal or desired attitude, the conical scan pattern of the sensor 10 is bisected by the horizon of the body being orbited.

The output of the sensor 10 is a signal denoted by the reference $A(\theta)$ in FIG. 1. This sensor output signal $A(\theta)$ is applied to a pair of demodulator units 12 and 13, along with signals $C(\theta)$ and $S(\theta)$ derived from the conical scan driver unit 11 to indicate the scanning angle of the sensor 10. More specifically, the output signal $C(\theta)$ is applied, along with sensor output signal $A(\theta)$ to demodulator unit 12 in order to produce an output signal on line 14 proportional to the amount of satellite pitch; whereas, signal $S(\theta)$ is applied, along with sensor output signal $A(\theta)$, to demodulator unit 13 to derive, on output line 15, a signal proportional to the amount of satellite roll. Although not shown in the drawings, the signals developed on output lines 14 and 15 can be applied, if desired, to a suitable attitude control system within the satellite so as to cause the satellite to maintain its nominal or desired attitude.

Figure 2:
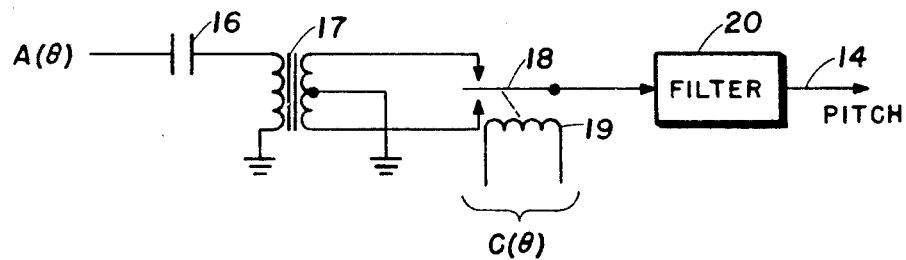
FIG. 2 is a circuit diagram of a demodulator unit capable of being used in the embodiment shown in FIG. 1.

One form of circuit capable of being used as demodulator 12 and/or 13 is illustrated in FIG. 2. More specifically, the sensor output signal $A(\theta)$ is applied through a DC filtering capacitor 16 to the primary winding of a transformer 17. The secondary winding of the transformer 17 is center-tapped to ground and the opposite ends of the secondary are connected to the stationary contacts of a suitable chopper switch 18. The operating winding 19 for the switch 18 is shown as being energized by the signal $C(\theta)$ from the conical scan driver unit 11. As will be obvious to a person skilled in the art, the circuitry of FIG. 2 functions to mix or multiply the signals $A(\theta)$ and $C(\theta)$ together. A filter 20 removes the chopping frequency from the combined signal and produces the output signal 14 proportional to the pitch of the satellite.

Figure 3:
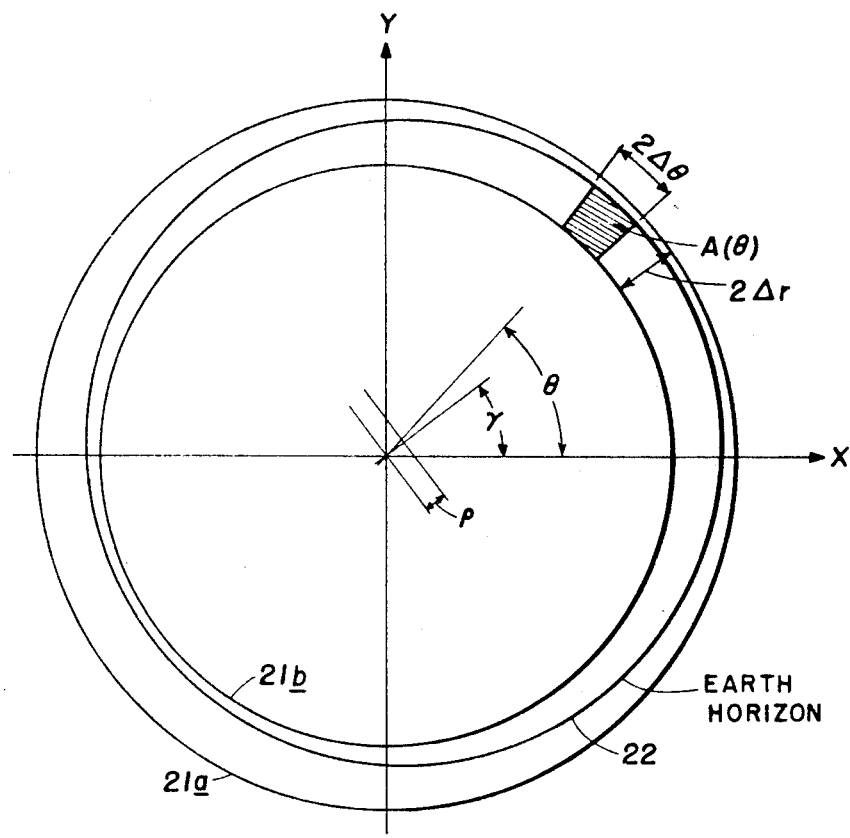
FIG. 3 is a diagrammatic illustration of the conical scanning pattern employed in the present invention for scanning the horizon of the body, such as the earth, about which the satellite or spacecraft is orbiting.

Referring now to FIG. 3 of the drawings, the scan pattern of the infrared horizon sensor 10 of FIG. 1 is circular in this planar view, with the scan limits denoted at 21a and 21b. When the satellite is in its nominal or desired attitude, the earth's horizon 22 will bisect the scan pattern limits 21a and 21b, the sensor output $A(\theta)$ would be a constant amplitude signal. On the other hand, when the satellite's attitude deviates from nominal as shown in FIG. 3, the earth's horizon 22 is displaced from the center of the scan by $\rho$, the off-vertical angle, and by the polar angle $\gamma$. These angular displacements are related to pitch and roll by:

$$\text{Pitch} = \rho \cos \gamma \quad (1)$$
$$\text{Roll} = -\rho \sin \gamma \quad (2)$$

The output $A(\theta)$ of the infrared sensor 10 is proportional to the amount of the earth's surface that it intersects and, in FIG. 3, this surface is denoted by the shaded area also designated $A(\theta)$. The sensor field of view at the polar angle $\theta$ is defined by $a \pm \Delta r$ and $\theta \pm \Delta \theta$; where $a$ is the radius of the scan center. The problem is first solved for $\gamma = 0$, where the equations of the horizon 22, inner scan circle 21b and outer scan circle 21a are respectively:

$$(x-\rho)^2 + y^2 = a^2 \quad \text{(horizon)} \quad (3)$$
$$x^2 + y^2 = (a - \Delta r)^2 \quad \text{(inner circle)} \quad (4)$$
$$x^2 + y^2 = (a + \Delta r)^2 \quad \text{(outer circle)} \quad (5)$$

and the equation for the surface $A(\theta)$ being viewed is $$A(\theta) = \int_{\theta-\Delta\theta}^{\theta+\Delta\theta} \int_{a-\Delta r}^{r(\theta)} r \, dr \, d\theta = \int_{\theta-\Delta\theta}^{\theta+\Delta\theta} \frac{(r(\theta))^2 - (a-\Delta r)^2}{2} d\theta \quad (6)$$

where $r(\theta)$ is the radius of the horizon 22 at angle $\theta$. To determine $r(\theta)$, a substitution of $x = r(\theta) \cos \theta$ and $y = r(\theta) \sin \theta$ is made in equation (3) so that, $$(r(\theta) \cos \theta - \rho)^2 + (r(\theta) \sin \theta)^2 = a^2 \quad (7)$$

to a first order approximation:

$$r^2 = a^2 + 2\rho a \cos \theta \quad (8)$$

so that equation (6) can be rewritten, $$A(\theta) = \int_{\theta-\Delta\theta}^{\theta+\Delta\theta} (\rho a \cos \theta + a \Delta r) d\theta$$

$$= 2a\Delta r \Delta\theta + \rho a[\sin(\theta + \Delta\theta) - \sin(\theta - \Delta\theta)]$$
$$= 2a\Delta r \Delta\theta + 2\rho a \sin \Delta\theta \cos \theta \quad (9)$$

Inasmuch as $\Delta\theta = \sin \Delta\theta$ at small angles, the equation for the surface $A(\theta)$ can be written as, $$A(\theta) = 2a\Delta\theta\Delta r(1 + \rho/\Delta r \cos \theta) \quad (10)$$

Replacing $\theta$ by $\theta - \gamma$, the generalized solution for the amount of earth's surface being viewed by the infrared sensor 10 of FIG. 1 is, for $\rho \leq \Delta r$, $$A(\theta,\gamma) = 2a\Delta\theta\Delta r(1 + \rho/\Delta r \cos(\theta - \gamma)) \quad (11)$$

Figure 4:
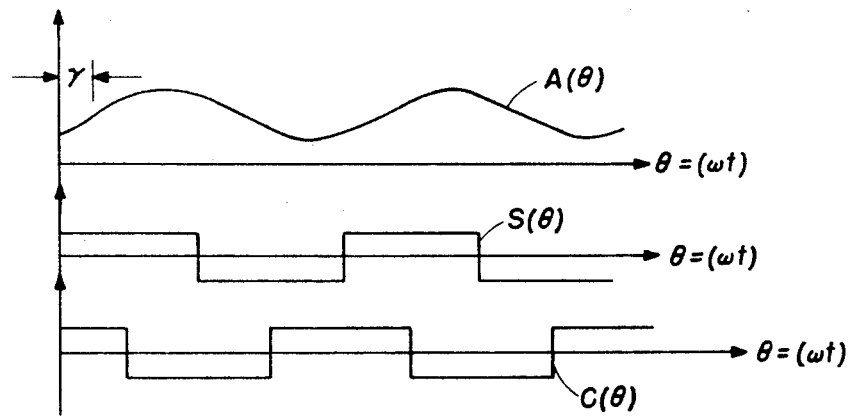
FIG. 4 depicts certain waveforms generated by the embodiment of FIG. 1.

As previously discussed, the sensor output signal $A(\theta)$ varies in proportion to the above amount of earth's surface defined by equation (11); i.e., the sensor output signal $A(\theta)$ has a DC component and an AC (cosine) component, as shown in FIG. 4. As also shown in the drawings, a DC filter (e.g., capacitor 16 in FIG. 2) allows only the cosine component of signal $A(\theta)$ to pass on to the demodulators 12 and 13 of FIG. 1.

Two square waves, $C(\theta)$ and $S(\theta)$ are derived from the scanner drive unit 11 and are defined mathematically as follows (see FIG. 4) to uniquely indicate or demarcate the sensor scanning angle:

$$S(\theta) = \begin{cases} 1, & 0 \leq \theta < \pi \\ -1, & \pi \leq \theta < 2\pi \end{cases} \quad (12)$$

$$C(\theta) = \begin{cases} 1, & \frac{\pi}{2} \leq \theta < \frac{\pi}{2} \\ -1, & \frac{\pi}{2} \leq \theta < \frac{3\pi}{2} \end{cases} \quad (13)$$

The AC component of sensor output signal $A(\theta)$ is demodulated in the mixers and filters contained in demodulator units 12 and 13 of FIG. 1. Mathematically, the operations are expressed by:

$$I_{14} = 2a\Delta\theta\rho \int_0^{2\pi} \cos(\theta - \gamma) C(\theta) d\theta = 2a\Delta\theta\rho \cos \gamma \quad (14)$$

$$I_{15} = 2a\Delta\theta\rho \int_{-\frac{\pi}{2}}^{\frac{3\pi}{2}} \cos(\theta - \gamma) S(\theta) d\theta = 2a\Delta\theta\rho \sin \gamma \quad (15)$$

Obviously, the signals $I_{14}$ and $I_{15}$ appearing on output lines 14 and 15 in FIG. 1 are proportional to spacecraft pitch and roll respectively and may serve as inputs to a spacecraft attitude control system (not shown) if desired.

The three problems of conventional horizon scanners; i.e., wavelength effect, latitude effect, and excessive bandwidth can now be considered. The necessary bandwidth is clearly reduced from that required to process a step change to that of the attitude control system; i.e., from hundreds of cycles per second to thousandths of a cycle per second. As previously noted, the effect of the wavelength in previously proposed horizon scanners is to distort the structure of the horizon-crossing step and this factor makes it quite difficult to design horizon detectors which must trigger on a threshold. On the other hand, the conical scan processor of the present invention requires only circular symmetry since the structure of the horizon-crossing step is integrated out. In addition, small variations from circular symmetry appear as random noise which can readily be removed by filtering. The latitude effect (denoted here by $\delta$) appears as the second harmonic of the scan frequency. In the demodulation process, this latitude effect vanishes because:

$$\int_0^{2\pi} C(\theta) \cos 2(\theta + \delta) d\theta = \int_0^{2\pi} S(\theta) \sin 2(\theta + \delta) d\theta = 0 \quad (16)$$

On the other hand, it may be possible to generate yaw information from the latitude effect. This would be done by demodulating $A(\theta)$ with twice the scan frequency. However, this is a very small effect which may be completely masked by system noise.

In view of the foregoing discussion, it will be seen that the use of a conically scanned infrared horizon sensor, as proposed in accordance with the present invention, has certain obvious advantages over conventional techniques. In general, the accuracy of the proposed horizon sensor method and apparatus is improved over that of a conventional sensor because correlation techniques are generally more accurate than threshold detection. Another advantage is that the accuracy of the proposed system is less dependent on the geographic latitude or choice of wavelength that it is in conventional systems.

I claim:

1. A method for measuring the attitude of a spacecraft relative to a celestial body such as the earth, comprising the steps of,
   conically scanning the horizon of the celestial body with a sensor to produce an output first signal which is of constant amplitude when said spacecraft is in its nominal attitude and which varies sinusoidally when the spacecraft deviates from said nominal attitude,
   producing a second signal comprising a pair of square waves demarcating the quadrants of a 360° scan by said sensor around the horizon of said body, one of said square waves being defined as:

$$S(\theta) = \begin{cases} 1, & 0 \leq \theta < \pi \\ -1, & \pi \leq \theta < 2\pi \end{cases}$$

and the other said square waves being defined as:

$$C(\theta) = \begin{cases} 1, & -\frac{\pi}{2} \leq \theta < \frac{\pi}{2} \\ -1, & \frac{\pi}{2} \leq \theta < \frac{3\pi}{2} \end{cases}$$

where $\theta$ is the scanning angle of said sensor, and combining said first and second signals to produce a third signal defining the attitude of said satellite.

2. The method specified in claim 1 wherein the step of combining said first and second signals involves, mixing said first signal with square wave $S(\theta)$ to determine the roll of said spacecraft, and mixing said first signal with the square wave $C(\theta)$ to determine the pitch of said spacecraft.

3. The method specified in claim 1 wherein said celestial body emits infrared radiation and said sensor is an infrared sensor.

4. The method specified in claim 1 wherein the sensor is scanned around a circular planar scan pattern with predetermined scan limits encompassing the horizon of the celestial body and wherein, the amplitude of the first signal output from said sensor varies sinusoidally in accordance with the relative location of the horizon within said scan limits around said sensor scan pattern, and the period of said sinusoidal amplitude variation being dependent upon the rate at which said sensor is conically scanned.

* * * * *